April 18, 1967

L. J. BONTRAGER 3,314,715

TRAVEL TRAILER

Filed Feb. 18, 1965

INVENTOR.
LLOYD J. BONTRAGER
BY
M. A. Hobbs
ATTORNEY

April 18, 1967

L. J. BONTRAGER 3,314,715

TRAVEL TRAILER

Filed Feb. 18, 1965

INVENTOR.
LLOYD J. BONTRAGER
BY
ATTORNEY

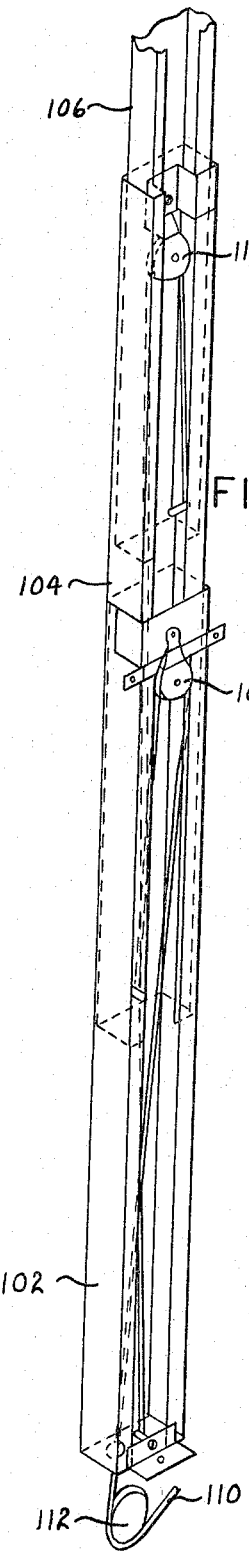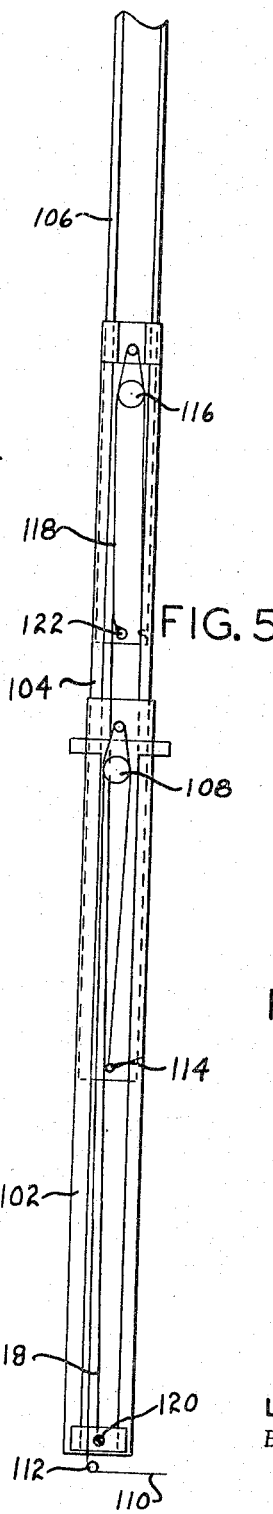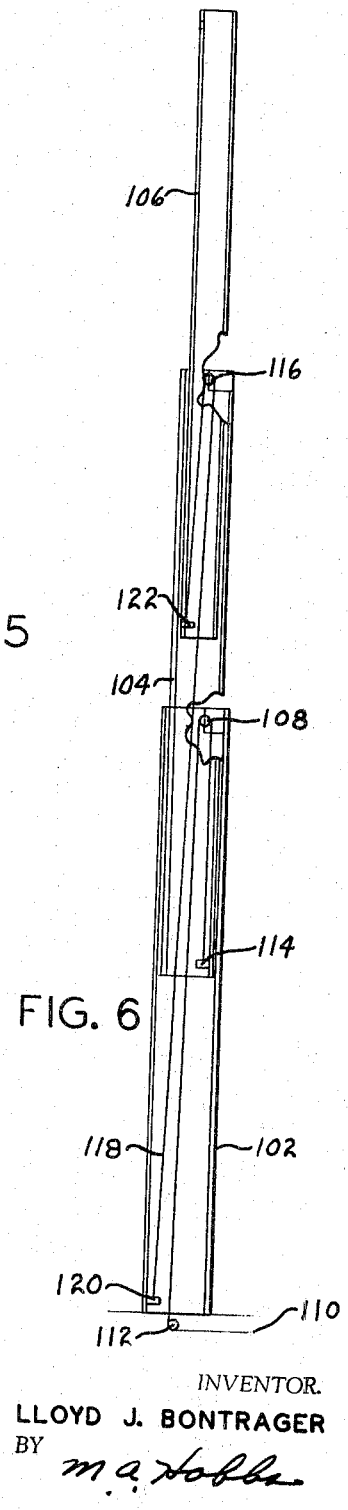

April 18, 1967 L. J. BONTRAGER 3,314,715
TRAVEL TRAILER

Filed Feb. 18, 1965 5 Sheets-Sheet 5

INVENTOR.
LLOYD J. BONTRAGER
BY *m.a. Hobbs*
ATTORNEY

United States Patent Office 3,314,715
Patented Apr. 18, 1967

3,314,715
TRAVEL TRAILER
Lloyd J. Bonfrager, Goshen, Ind., assignor to Star Tank and Boat Company, Goshen, Ind., a corporation of Indiana
Filed Feb. 18, 1965, Ser. No. 433,733
6 Claims. (Cl. 296—23)

The present invention relates to trailers and more particularly to travel trailers having a top which is lifted and lowered to expand and contract the trailer.

In recent years the small two-wheeled trailer which can be easily towed by the conventional passenger car and which provides small but efficient living quarters has become popular and is extensively used for vacations, camping and hunting trips. In order for travel trailers to have good roadability while they are being towed without sarcrificing the necessary space for comfortable living, they have been constructed with a foldable section whereby the top is lowered onto a relatively low body portion to form a compact unit which offers little wind resistance and which minimizes the tendency to whip and sway. Foldable structures are used to form the foldable section, including hinged panels which fold inwardly between the body and top when the top is lowered, or plastic sheet material which is rolled or folded as the top. Various types of mechanisms have been used to raise and lower the top and to support it rigidly in its fully raised position. Most of these prior mechanisms have had disadvantages or difficulties, including the necessity of requiring direct lifting of the top by the operator or involving complicated mechanisms which are expensive or difficult to operate and maintain in effective operable condition. Further, a number of these prior mechanisms have operating parts which are mounted externally of the trailer body and are exposed to view, or are so placed beneath the body that they are subjected to road dust, dirt and slush, and hence require frequent service. It is therefore one of the principal objects of the present invention to provide a travel trailer having a top which is raised and lowered from the body, operated by a mechanism completely confined within the body with the exception of cables and pulleys for operaitng the mechanism.

Another object of the invention is to provide a mechanism for raising and lowering the top of a foldable travel trailer, which consists of a telescopic post at each of the four corners of the body which retracts completely within the body when the top is lowered, requiring a minimum amount of operating space, and which moves only vertically when the top is raised and lowered.

Still another object of the invention is to provide a compact, versatile mechanism for raising and lowering the top of foldable travel trailers, which can be installed on foldable trailers of various sizes and designs and, since the operating connecting means is of the cable and pulley construction, can be readily adapted to the frame construction of the trailer regardless of the location of the cross members of the frame or the position of the tongue.

A further object is to provide a foldable travel trailer of the aforesaid type having side walls which can fold and unfold automatically when the top is lowered and raised, and having a top adapted to be raised and lowered by the use of a winch or reel conveniently located on the trailer, from where the entire lifting and lowering operation can be performed.

Another object of the invention is to provide a top lifting, lowering and supporting mechanism for travel trailers, which can readily be fabricated from standard materials and which is virtually trouble-free, but which can easily be serviced while the unit is in its expanded position without disassembling the parts.

Additional objects and advantages of the present invention will become apparent from the following description and accompanying drawings, wherein:

FIGURE 4 is a perspective view of the telescopic post construction mechanism;

FIGURE 5 is a front elevational view of the mechanism shown in FIGURE 4;

FIGURE 6 is a side elevational view of the mechanism shown in FIGURES 4 and 5 with portions broken away to better illustrate the construction of the structure.

Figure 1:
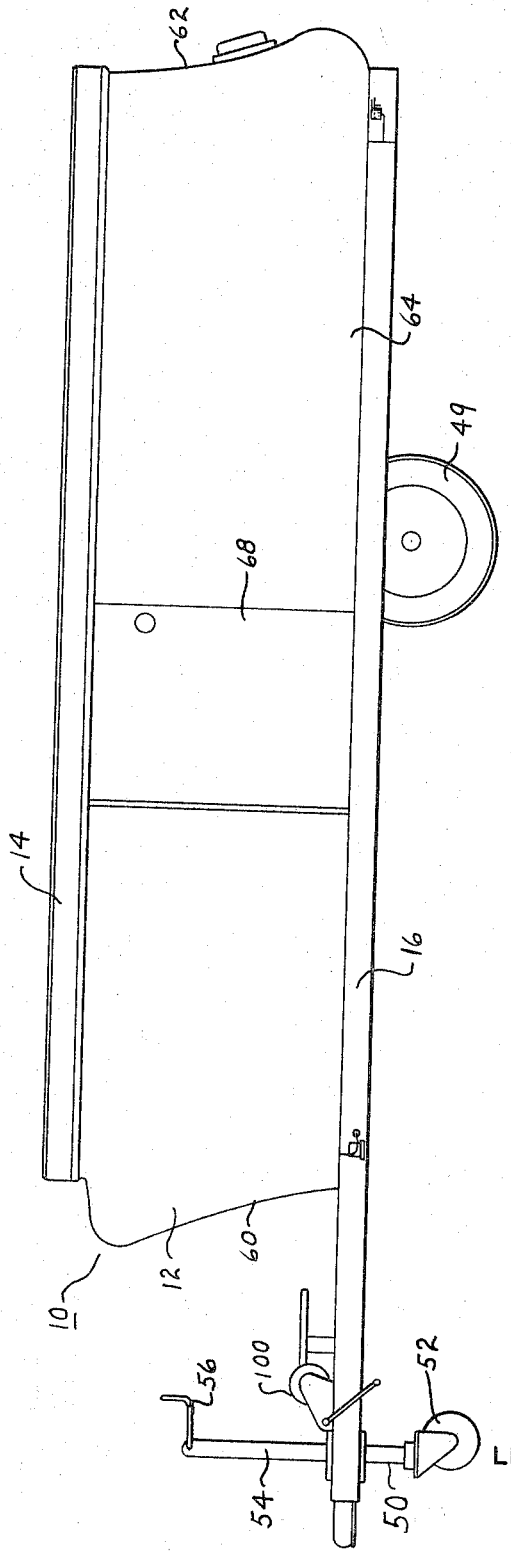
FIGURE 1 is a side elevational view of the travel trailer with the top lowered onto the body in closed position.
Figure 2:
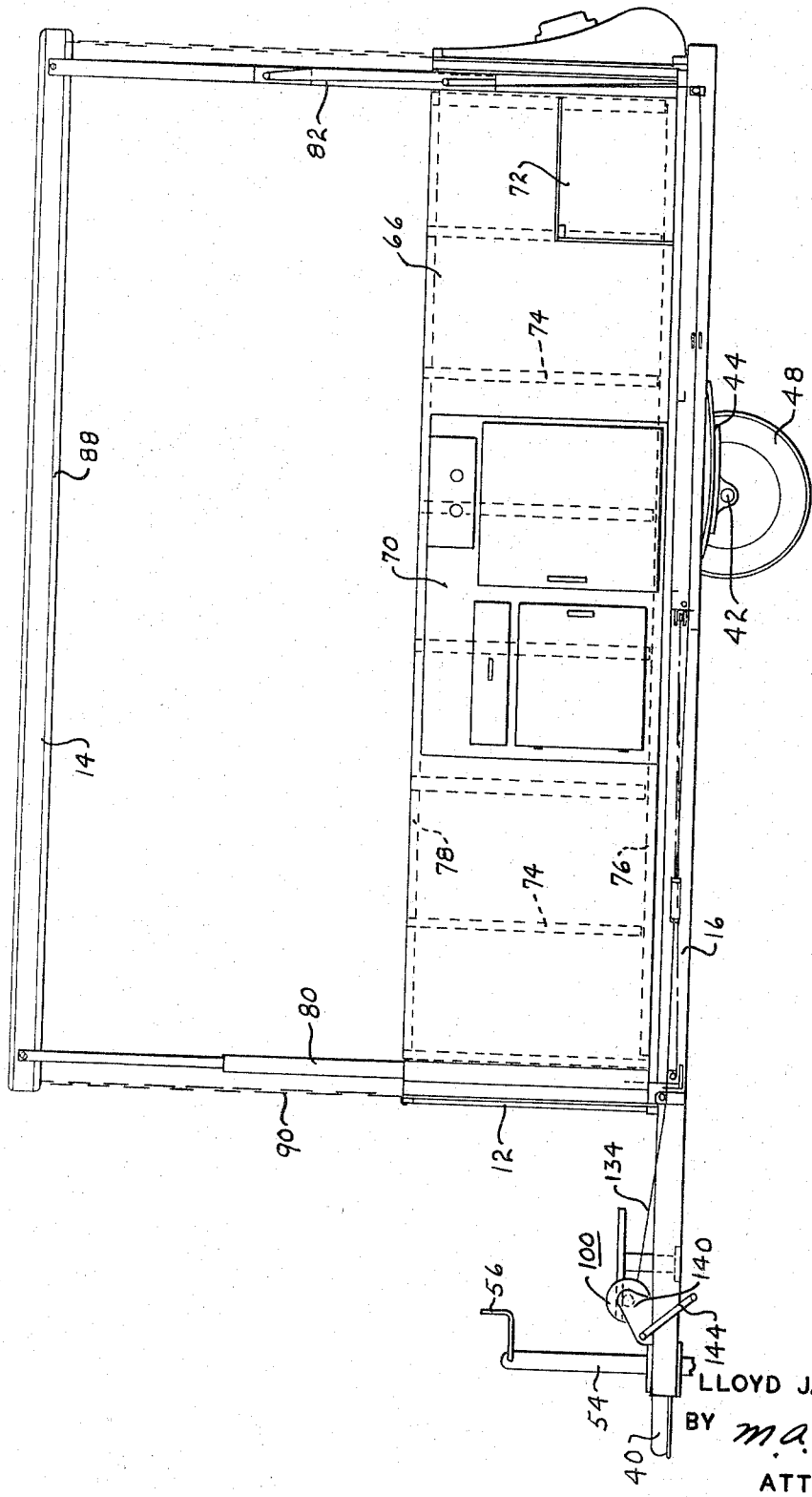
FIGURE 2 is a longitudinal vertical cross sectional view of the trailer shown in FIGURE 1.
Figure 3:
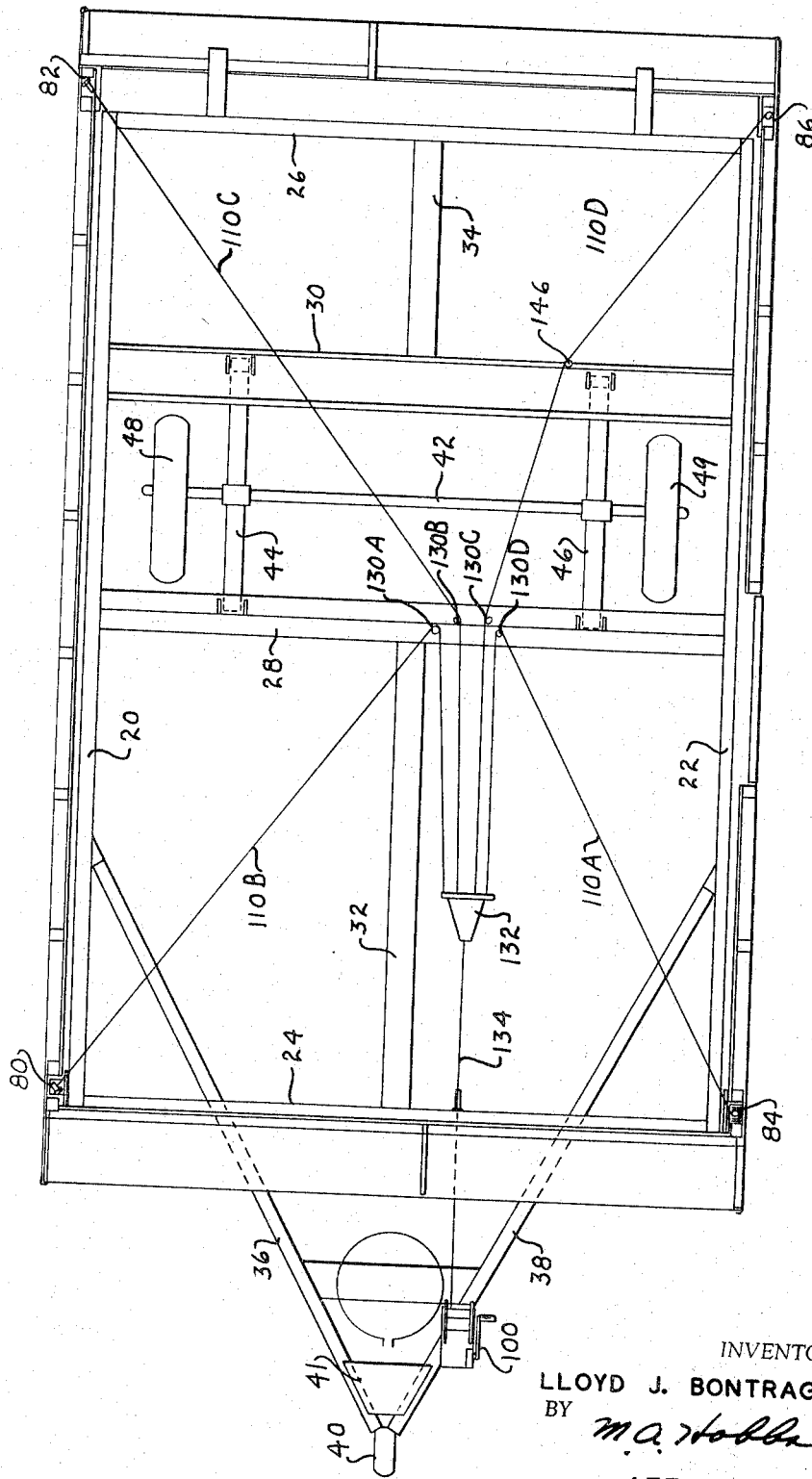
FIGURE 3 is a top plan view of the frame of the trailer shown in the preceding figures, with the body removed to better illustrate the operating mechanism of the present top raising and lowering mechanism.

Referring more specifically to the drawings and to FIGURES 1, 2 and 3 in particular, numeral 10 designates generally the present travel trailer, 12 the body, 14 the top resting on the upper edge of the body, and 16 the frame and undercarriage which may be considered conventional for the purpose of the present description.

The frame consists of two longitudinal side members 20 and 22, end members 24 and 26 and cross members 28 and 30. The longitudinal reinforcing member 32 extends between end member 24 and cross member 28 and reinforcing member 34 extends between cross member 30 and end member 26. The tongue consists of two angularly positioned members 36 and 38 joined at their rear ends to the sides of the two members 20 and 22, respectively, and connected to one another by a hitch 40 and cross member 41. The undercarriage consists of an axle 42 connected to the cross members 28 and 30 by springs 44 and 46, and having wheels 48 and 49 mounted on the ends thereof. The forward end of the frame is supported, when the trailer is disconnected from the vehicle, by a lift 50 having a wheel 52 and a mechanical jack mechanism 54 and operating handle 56. When the trailer is being towed, hitch 40 is connected to a tow-bar or other fixture on the rear of the towing vehicle.

Body 12 of the trailer illustrated in FIGURES 1 and 2, is mounted rigidly on frame 16 and has two front and rear ends 60 and 62 and sides 64 and 66, side 64 having a door 68 near the center thereof. In FIGURE 2 some of the furnishings of the body are illustrated, numeral 70 designating cupboards with conventional doors and drawers, and 72 illustrating a bunk or storage compartment. The internal wall construction is illustrated in broken lines and consists of studding 74 and stringers 76 and 78 for supporting the internal and external wall panels.

The top 14 is supported by posts 80, 82, 84 and 86, mounted in the corners of body 12, and is provided with downwardly extending sidewalls of flange 88 which seats on the upper edge of body 12 and forms an effective, water-tight seal therewith. When top 14 is in its raised position, as illustrated in FIGURE 2, the space between the top of the body and the lower edge of the top is, in the present embodiment, closed by a durable plastic panel material 90 having suitable windows of flexible plastic material which are adaptable to fold along with the foldable material 90. A door or flap positioned above door 68 is provided in the material so that the occupants can enter and leave the trailer compartment in upright position.

Figure 7:
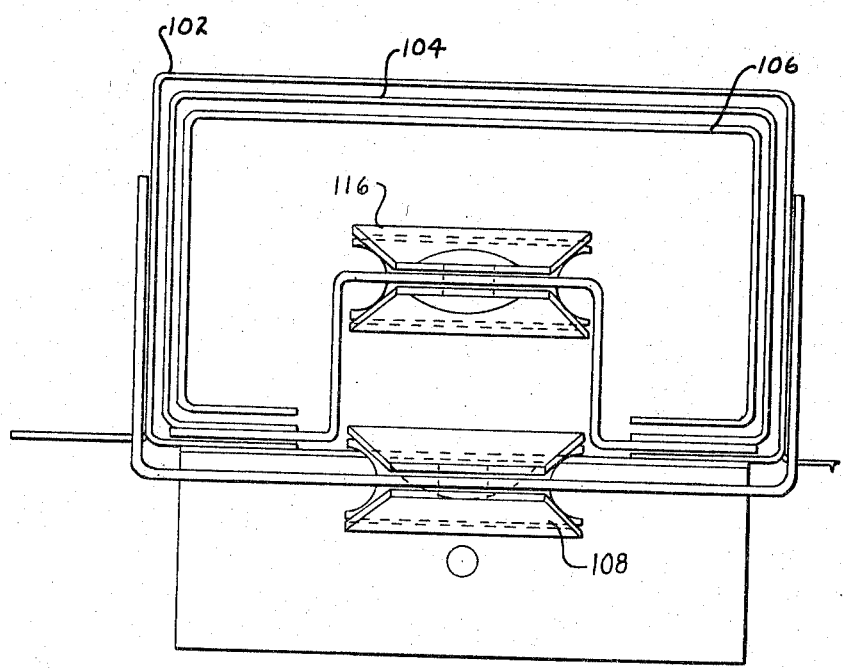
FIGURE 7 is an enlarged end view of the telescopic post structure shown in FIGURES 4, 5 and 6.

The mechanism for lifting and lowering the top 14 consists of four telescopic posts 80, 82, 84 and 86, and a cable system connecting the posts to a winch or reel 100 mounted on the front of the trailer or at some other convenient location. The four posts are identical to one another and are rigidly mounted in the four corners of body 12, each post consisting of a lower section 102, an intermediate section 104, which slips longitudinally into the lower section, and upper section 106, which slips longitudinally into intermediate section 104 and with the intermediate section, slips into the lower section 102 when the post is fully retracted. The four sections are rectangular in shape, as illustrated in FIGURE 7, with an opening along one side extending the full length thereof. The three sections slide readily from their fully detracted position when the top is down to a substantially fully extended position when the top is up. The mechanism for moving the three sections between the fully retracted position and their fully extended position consists of a cable mounted on a series of pulleys, best illustrated in FIGURES 4, 5 and 6. A pulley 108 is secured to the upper end of section 102, and the main operating cable 110 passing over a pulley 112 extends over pulley 108 and is anchored at anchor point 114 at the bottom of section 104. By this construction, movement of cable 110 to the right as viewed at the bottom of FIGURE 5, causes section 104 to move into its extended position. A pulley 116 is mounted in the upper end of section 104, and a cable 118 anchored at one end on anchor point 120 at the lower end of section 102, is trained on pulley 116 and anchored at the other end at anchor point 122 at the bottom of section 106. Thus, movement of pulley 116 with section 104 causes telescopic section 106 to extend itself relative to section 104 and section 102. It is thus seen that the force applied by cable 110 is transmitted through cable 118 to the telescopic section 106. When the top is to be lowered, the weight of the top is sufficient to return the telescopic sections to their completely retracted positions with the downward movement being controlled by the winch or reel. Cables 110(a), (b), (c) and (d) are trained on pulleys 130(a), (b), (c) and (d), mounted on cross member 28 near the center of the trailer frame, and are connected to a galley 132, which in turn is connected by a cable 134 to winch 100. It is thus seen that cables 110(a), (b), (c) and (d) are moved simultaneously when the winch is operated to extend and contract the four posts simultaneously. The winch or reel, which for the purpose of the present invention may be considered conventional, preferably has a gear reduction unit so that the operation can be performed with little applied force. A ratchet or pawl mechanism 140 is included for the purpose of holding the winch at any adjusted position, i.e. when the winch has been operated by handle 144 to lift the top to its elevated position, as illustrated in FIGURE 2, the pawl of the ratchet mechanism is set so that the reel will stay in its wound condition holding the cables taut and the posts in their extended position. A separate locking mechanism may be used with each post after the posts have been extended, if desired. It is seen that one of the advantages of the present cable-operated post structure is that the cables can be placed in any convenient location beneath the trailer body using suitable pulleys to guide the cables around the frame members, as illustrated by pulley 146 mounted on frame member 30. This increases the versatility of the particular operating mechanism and makes it easily adaptable to various types of trailer construction and design.

In the operation of the present trailer with the top in the lowered position, as illustrated in FIGURE 1, operation of winch 100 winds cable 134 on the reel, thereby pulling the cables 110(a), (b), (c) and (d) downwardly in the four posts. As the cable moves downwardly in each post, the end of the cable anchored at anchor point 114 is lifted upwardly, causing section 104 to become extended or lifted relative to section 102. As pulley 116 which is mounted on section 104 is lifted, cable 118 which is anchored at one end to the lower end of section 102 and at the other end to anchor point 122 at the bottom of section 106, lifts section 106 as section 104 is moved, thus extending section 106 relative to section 104. After the top has been raised to its fully extended position, the pawl of the ratchet mechanism 140 is locked in place, thus preventing the reel from unwinding and thereby holding the top in its lifted position. When it is desired to lower the top, the pawl is released and the operator controls the speed at which the top is lowered by controlling the unwinding of the reel through the use of handle 144.

While only one embodiment of the present invention has been described in detail herein, various changes and modifications may be made without departing from the scope of the invention.

I claim:

1. A travel trailer comprising a frame with a forwardly extending portion, an undercarriage supporting said frame, a rectangularly shaped body on said frame, a rectangular top movable from a lowered position on said body to a raised position spaced above said body, foldable means between said body and top for closing the space between the body and top when the top is in raised position, a mechanism for lifting and lowering the top including a main operating cable, a telescopic post at each corner of said body, each post consisting of lower, intermediate and upper sections, pulley means at the upper end of said lower and intermediate sections, a cable connected to the lower end of said upper section and extending over the pulley means on said intermediate section to an anchor point at the lower end of said lower section, a cable connected to the lower end of said intermediate section and extending over the pulley means on said lower section to a point beneath said body, means connecting each of said last mentioned cables to said main cable, said lower section being mounted rigidly on said body and said upper section being connected to the underside of said top, a reel mounted on said frame near the front thereof for winding said main cable, and a means for preventing rotation of said reel for holding said posts in their extended position said connecting means being positioned on said main cable at a point beyond the section of said main cable wound on said reel.

2. A travel trailer comprising a frame, an undercarriage supporting said frame, a rectangularly shaped body on said frame, a rectangular top movable from a lowered position on said body to a raised position spaced above said body, foldable means between said body and top for closing the space between the body and top when the top is in raised position, a mechanism for lifting and lowering the top including a main operating cable, a telescopic post at each corner of said body, each post consisting of lower, intermediate and upper sections, pulley means at the upper end of said lower and intermediate section, a cable connected to the lower end of said upper section and extending over the pulley means on said intermediate section to an anchor point at the lower end of said lower section, a cable connected to the lower end of said intermediate section and extending over the pulley means on said lower section to a point beneath said body, means connecting each of said last mentioned cables to said main cable, a reel for winding said main cable, and a means for preventing rotation of said reel for holding said posts in their extended position, said connecting means being positioned on said main cable at a point beyond the section of said main cable wound on said reel.

3. A trailer comprising a frame, a body on said frame, a rectangular top movable from a lowered position on said body to a raised position spaced above said body, foldable means between said body and top for closing the space between the body and top when the top is in raised position, a mechanism for lifting and lowering the top including a main operating cable, a telescopic post at each corner of said body, each post consisting of lower, intermediate and upper sections, pulley means at the upper end of said lower and intermediate sections, a cable connected to the lower end of said upper section and extending over the pulley means on said intermediate section to an anchor point at the lower end of the lower section, a cable connected to the lower end of said intermediate section and extending over the pulley means on said lower section to a point beneath said body, means connecting each of said last mentioned cables to said main cable and a reel for winding said main cable, said connecting means being positioned on said main cable at a point beyond the section of said main cable wound on said reel.

4. In a travel trailer having a frame, a body on said frame, a top movable from a lowered position on said body to a raised position spaced above said body, a mechanism for lifting and lowering the top, including a main operating cable, a telescopic post at each corner of said body, each post consisting of lower, intermediate and upper sections, pulley means at the upper end of said lower and intermediate sections, a cable connected to the lower end of said upper section and extending over the pulley means on said intermediate section to an anchor point at the lower end of said lower section, a cable connected to the lower end of said intermediate section and extending over the pulley means on said lower section to a point beneath said body, means connecting each of said last mentioned cables to said main cable, and a reel for winding and unwinding only said main cable to lift and lower said top.

5. In a travel trailer having a body and a top movable between a lowered and a raised position: a mechanism for lifting and lowering the top, including a main operating cable, a plurality of spaced telescopic posts, each post consisting of lower, intermediate and upper sections, pulley means at the upper end of said lower and intermediate sections, a cable connected to the lower end of said upper section and extending over the pulley means on said intermediate section to an anchor point at the lower end of said lower section, a cable connected to the lower end of said intermediate section and extending over the pulley means on said lower section to a point beneath said body, means connecting each of said last mentioned cables to said main cable and a reel for winding said main cable, said connecting means being positioned on said main cable at a point beyond the section of said main cable wound on said reel.

6. In a travel trailer having a body and a top movable between a lowered and raised position: a mechanism for lifting and lowering the top, including a plurality of spaced telescopic posts having lower, intermediate and upper sections, pulley means at the upper end of said lower and intermediate sections, a cable connected to the lower end of said upper section and extending over the pulley means on said intermediate section to an anchor point at the lower end of said lower section, a cable connected to the lower end of said intermediate section and extending over the pulley means on said lower section to a point beneath said body, means connecting each of said last mentioned cables to said main cable, and a reel for winding and unwinding only said main cable to lift and lower said top.

References Cited by the Examiner

UNITED STATES PATENTS

| 459,613 | 9/1891 | Newman | 42—121 X |
| 2,292,107 | 8/1942 | Doepke | 296—23.3 |
| 2,675,211 | 4/1954 | Regoord | 52—121 X |
| 2,853,338 | 9/1958 | Stanley | 296—23 |

FOREIGN PATENTS 863,949  3/1961  Great Britain.

BENJAMIN HERSH, *Primary Examiner.*

P. GOODMAN, *Assistant Examiner.*